Figure 1:
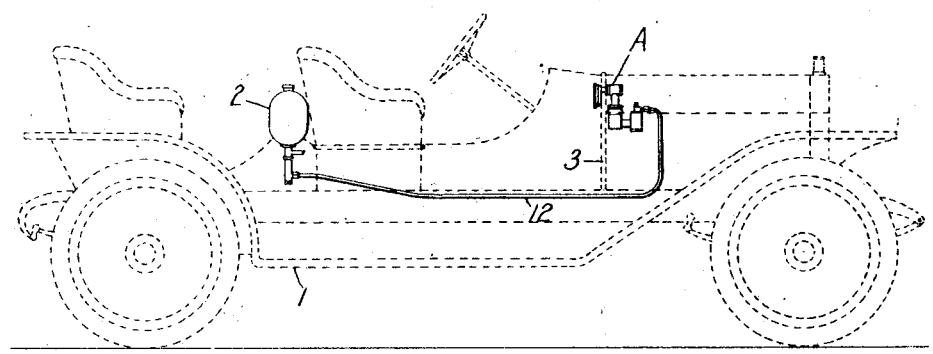

C. H. DRAPER & C. F. ROPER.
GAGE.
APPLICATION FILED AUG. 3, 1911.

1,051,711.

Patented Jan. 28, 1913.

3 SHEETS—SHEET 1.

Witnesses:
Amelia M. Rose
May A. Hurley

Inventors:
Clare H. Draper,
Charles F. Roper
by Rob't P. Harris, Atty.

C. H. DRAPER & C. F. ROPER.
GAGE.
APPLICATION FILED AUG. 3, 1911.

1,051,711.

Patented Jan. 28, 1913.
3 SHEETS-SHEET 3.

Witnesses:
Amelia M. Ross
May A. Hurley

Inventors
Clare H. Draper,
Charles F. Roper
by Robt. P. Hains, Atty.

UNITED STATES PATENT OFFICE.

CLARE H. DRAPER AND CHARLES F. ROPER, OF HOPEDALE, MASSACHUSETTS, ASSIGNORS TO C. F. ROPER & COMPANY, OF HOPEDALE, MASSACHUSETTS, A COPARTNERSHIP.

GAGE.

1,051,711.

Specification of Letters Patent.

Patented Jan. 28, 1913.

Application filed August 3, 1911. Serial No. 642,103.

*To all whom it may concern:*

Be it known that we, CLARE H. DRAPER and CHARLES F. ROPER, citizens of the United States, residing at Hopedale, in the county of Worcester and State of Massachusetts, have invented an Improvement in Gages, of which the following description, in connection with the accompanying drawings, is a specification, like letters on the drawings representing like parts.

The invention to be hereinafter described relates to gages for indicating the amount of liquid in a reservoir or other receptacle.

It has heretofore been proposed to provide a gage or indicator connected to a reservoir or tank to make known the height of the liquid in the reservoir or tank, and where this system has been stationary or not subjected to bodily disturbance, such gages or indicators have served their purpose with more or less accuracy. In cases, however, where the system has been liable to bodily disturbance, as in automobiles, motor boats, railroad trains, and other instances—while the indicator or gage would show the actual height or amount of liquid in the reservoir or tank when the system was in normal level position, it has failed to do so when the normal level position of the system was disturbed, as, for instance, in the case of an automobile going up or down hill or on a road transversely inclined. When thus disturbed, the gage or indicator would heretofore indicate either too much or too little liquid in the reservoir or tank and the systems heretofore employed have been quite unreliable except when in normal level position.

The aims and purposes of the present invention are to provide a device of the general character stated wherein the indicating means shall accurately note the amount of liquid in the reservoir or other receptacle regardless of bodily disturbance of the reservoir or receptacle; and its further object is to provide a device which shall be simple in construction and efficient in operation, all of which will best be made clear from the following description and accompanying drawings of one form of means for carrying the invention into practical effect.

For convenience of description and to make clear certain broad features of the invention, it is shown and described as associated with the gasolene tank of an automobile, but it is to be distinctly understood that the broad features of the invention are not restricted thereto, but, on the contrary, that they are applicable to any system wherein the liquid reservoir, the amount of liquid which is to be indicated, is subject to bodily disturbance; as, for instance, liquid or gasolene tanks in motor boats, tanks and liquid receptacles on railroad trains, and so on; and that in certain of its features the invention is of general application, all as will hereinafter appear.

Figure 2:
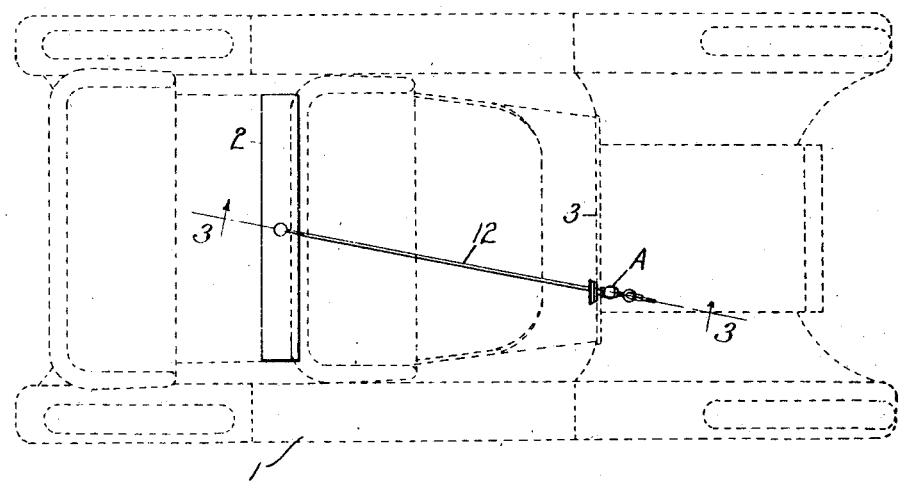
Figure 3:
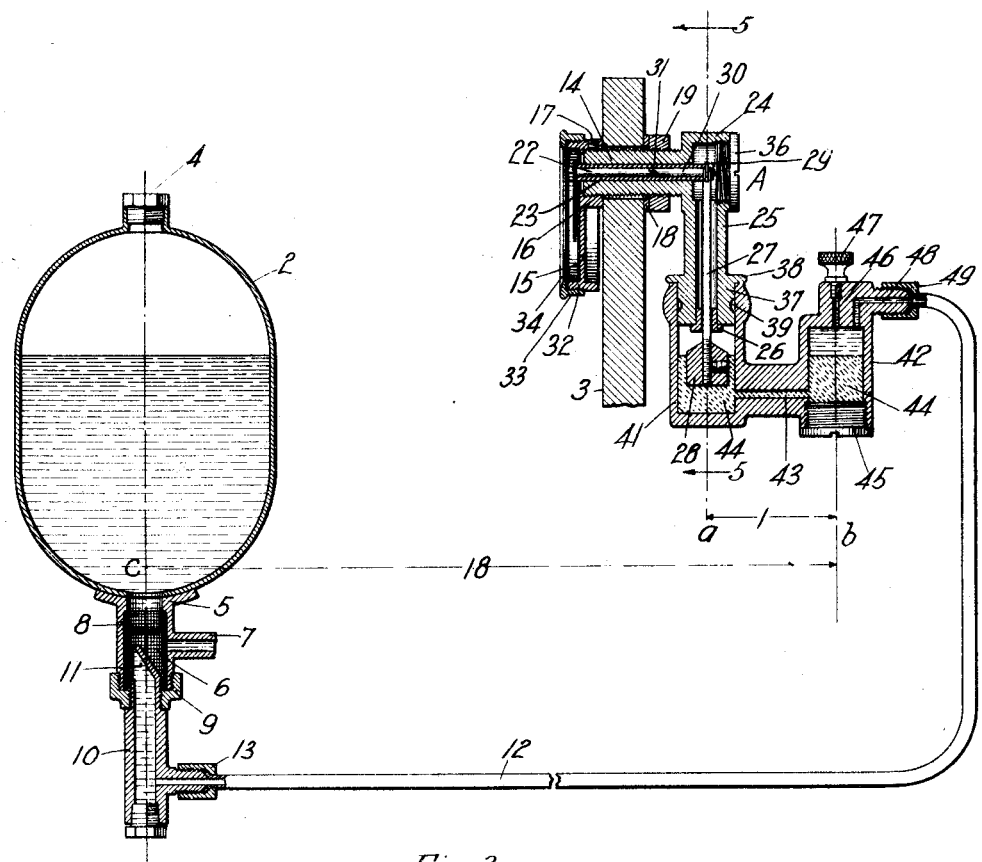
Figure 4:
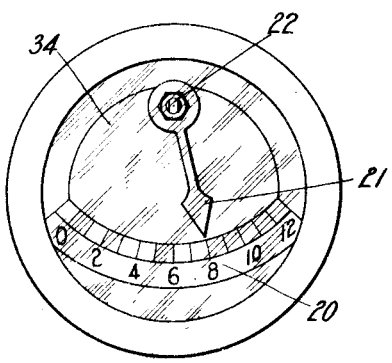
Figure 5:
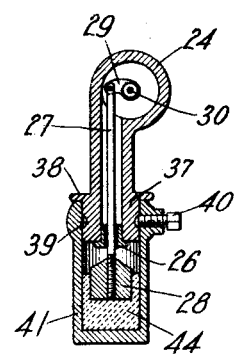
Figure 6:
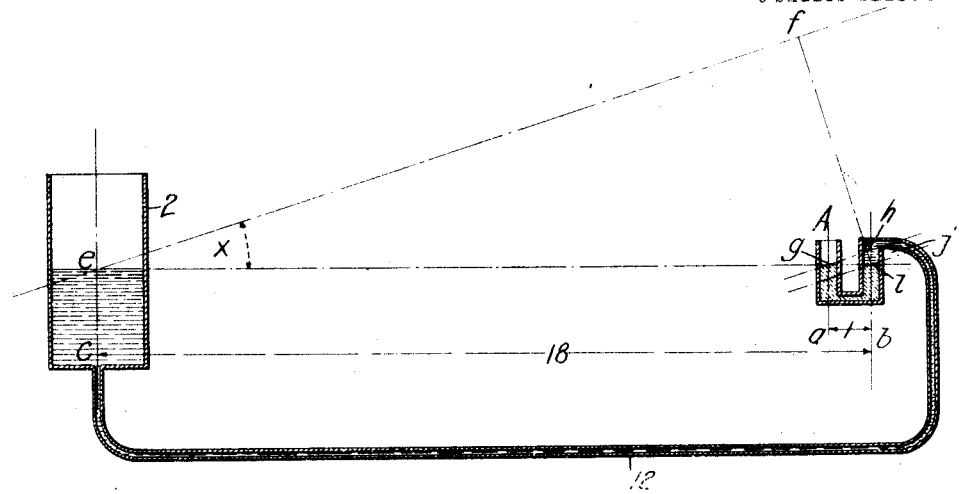
Figure 7:
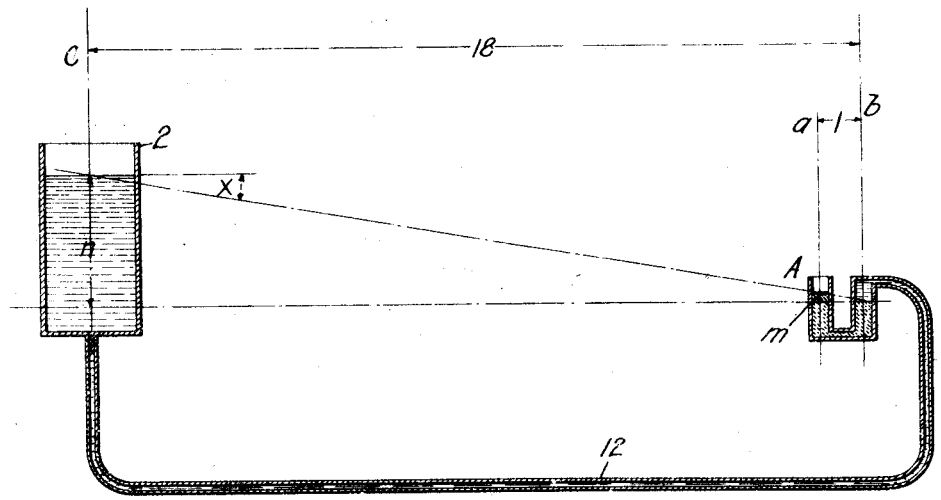

In the drawings:—Figure 1 represents by dotted lines a side elevation of an automobile embodying features of the present invention; Fig. 2 represents in like manner a plan view of the same; Fig. 3 represents an enlarged section substantially on the line 3—3, Fig. 2, the liquid tank or reservoir, the gage or indicator, and their connections being shown detached from the automobile; Fig. 4 is a face view of the indicator device; Fig. 5 is a section on the line 5—5, Fig. 3; Fig. 6 is a diagrammatic view to illustrate in simple manner the broad principles of the invention and its manner of operation when the liquid level in the tank or reservoir and that in the indicator chamber are at the same height and the system is disturbed by changing its level; and Fig. 7 is a like view illustrating similar conditions when the head of liquid in the tank or reservoir is above that in the indicator chamber.

In the drawings, 1 represents some type of carrier for the tank, indicator, and connections, which, for identification, may be hereinafter termed the system. In the present illustrated application of the system, the carrier is conveniently shown as an automobile, but it is to be understood that the invention is not restricted in this respect, and the tank or reservoir 2 is typified by the gasolene tank of an automobile which may be of any usual type and located in convenient position. To the dash board 3 of the automobile is secured the indicator, the face of which is conveniently located for ready inspection by the operator.

The gasolene tank 2 has an opening at its top that it may be conveniently filled, as usual, said opening being closed by a screw cap or plug 4. At the bottom of the tank is an outlet 5 having a chamber 6 communicating with a tube 7 leading to the engine or carbureter of the automobile which by suction draws charges of gasolene through the tube 7 to be exploded in the engine cylinders, as usual. A screen of wire gauze 8 is fitted in the chamber 6 to prevent any dirt being carried by the gasolene to the carbureter or engine.

Screw threaded to the bottom portion of the outlet 5 is a cap 9 having a perforation through which extends the upper portion of the tube 10, said tube 10 being preferably secured in place by screw thread connection with the cap 9, as indicated, and having a side inlet 11 which may extend into the wire screen or cage 8, if desired. It will be noted that the opening into the tube 10 is disposed at the side thereof remote from the entrance to the tube 7, the effect of which is to nullify to a large extent at least any disturbing influence of the engine suction upon the column of gasoline extending into the tube 10 and to the indicator, as will more fully appear. Obviously, the tank 2, its outlet and other adjacent parts may be of any general form and arrangement; and the position of the tube 10 and its entrance 11 may be variously changed, the essential being that disturbance of the liquid in tube 10 and the column extending to the indicator by the engine suction be avoided.

Communicating with the tube 10 is the tube 12, the end of which may be conveniently connected to the lower portion of the tube 10 by any usual form of coupling 13.

Mounted on the dash board 3, or other convenient support, is the indicator, which as a whole may be identified by A, Fig. 3. Since the dash boards of automobiles or other supports for the indicator differ in form and thickness, the present invention contemplates means for securing the indicator to its support regardless of variations in the support itself. As one means to this end, the stem 14 is provided with screw threads and is passed through a suitable opening in the dash board or support.

Secured to the end of the stem 14 is the indicator disk 15 having the hub 16 screw threaded to the end of the stem 14 and secured or locked in proper position by a set screw 17, Fig. 3. Loose on the stem 14 at the other side of the dash board or support 3 is a washer 18 which may be caused to clamp the dash board between itself and the hub 16 of the disk 15 by means of a nut 19, Fig. 3; the construction being such that regardless of the thickness of the dash board or support 3 the indicator may be readily secured in place.

The disk 15 is provided with a scale 20, Fig. 4, over which plays the pointer 21 which is secured to a rod 22 extending longitudinally through the stem 14, and preferably surrounded by a sleeve 23, Fig. 3.

The stem 14 is provided with an enlarged portion 24 from which extends the part 25, Fig. 3, having a bearing 26 for the float rod 27 rising from a float 28, and at its upper end the float rod is connected to an arm 29 secured to a rod 30 extending longitudinally of the indicator supporting stem 14. The rods 22 and 30 are detachably connected by means of interlocking projections and recesses 31, as indicated in Fig. 3, the construction being such that as the float 28 rises and falls it will impart to the rods 22 and 30 movement of rotation and move the pointer 21 over the scale 20 on the face of disk 15.

As a convenient means for maintaining the rods 22 and 30 in operative relation and yet permit them to be readily disengaged for purposes of cleaning, renewal, and assembling, the disk 15 has a screw flange 32 engaged by the screw flange 33 of a transparent face plate 34, the construction being such that the plate 34 prevents longitudinal movement of the rod 22 to the left, Fig. 3, sufficiently to cause disengagement of the rods 22 and 30. Likewise the enlarged portion 24 of the indicator supporting stem is closed by the screw cap 36, the inner surface of which is sufficiently close to the end of the rod 30 to prevent disengaging longitudinal movement with respect to rod 22.

From the construction described, it will be noted that while the plate 34 and cap 36 normally prevent disengagement of the rods 22 and 30, yet such disengagement may be readily effected by the removal of either.

That part of the device or system which is to contain the indicator liquid, such as mercury or other suitable fluid, may for the purpose of identification as a whole, be herein referred to as the indicator chamber, and is connected to the indicator to permit horizontal adjustment thereof for a purpose that will presently appear. As one means to this end the downwardly extending portion 25 of the indicator may be provided with a head 37 surmounted by a flange 38, the said head being preferably provided with a recess 39 extending about it to be engaged by the end of a set screw 40, Fig. 5, carried by a part of the indicator chamber to be described, the construction, regardless of details, being such that the indicator chamber may be adjusted horizontally about the head 37 and then secured in position for a purpose to be presently described.

The indicator chamber may vary in form, shape, and general character, but a convenient and good practical form as herein illustrated comprises the parts 41 and 42 having communication through a connection 43 and adapted to contain the selected indicator liquid. For the purposes of identification but without limitation, the part 41 may be known as the float portion or compartment, and the part 42 as the pressure compartment, because the indicator liquid in the part 42 receives upon it the pressure of the liquid head or column in the tank or reservoir 2. The bottom of the pressure compartment 42 may be conveniently closed by a plug 45, and the top thereof be provided with a vent 46 vertically closed by the screw cap or plug 47.

Connected to the top of the part or pressure compartment 42 of the indicator chamber is the tube 12, Fig. 3, which leads from the tank 2, said connection being preferably formed by a passageway 48 through the top portion of the part or pressure compartment 42 communicating with and attached to the tube 12 by a suitable joint 49.

The liquid 44 may be of any suitable character, preferably of greater specific gravity than the liquid in the reservoir or tank the height or quantity of which is to be indicated. In the present form of the invention the liquid in the indicating chamber is preferably mercury, the specific gravity of which is many times greater than that of gasolene in the tank 2, and for the purposes of exploiting this feature of the invention, it may be assumed that the mercury has a specific gravity about eighteen times that of the gasolene.

From the construction described it will be apparent that the indicator chamber being supplied with mercury or other indicator liquid and the connections between the tank and the part 42 being filled with the liquid from the tank 2, that any change in level of the liquid in the tank 2 while the system is horizontal will be indicated by the pointer 21 and scale 20 by means of the float 28 acting through its connections with the pointer; and in order that the parts may be properly adjusted and related to cause the pointer to indicate zero on the scale when the tank is substantially empty and to correspondingly indicate on the scale the true height or quantity of liquid in the tank, the float 28 is adjustably connected to the float rod 27. As one convenient form of such connection the float is connected to the rod by a screw thread, as indicated in Fig. 5, whereby its relation or position with respect to the rod may be changed to bring the pointer on the proper mark of the scale when adjusting the instrument.

Should the level or horizontal position of the system be changed, however, as in case of an automobile, for instance, going up or down hill, it is evident that the pointer will move over the scale and indicate more or less liquid in the tank than is actually the case unless provision is made to prevent such action. In order to overcome this error and enable the indicator to note the true height of the liquid in the tank 2 regardless of disturbance in the system or change of horizontal position, the horizontal distance or column of mercury (a—b) between the central vertical axes of the float and pressure compartments of the indicator chamber is proportioned to the horizontal distance or column (c—b) of liquid between the central vertical axis of the tank 2 and the central vertical axis of the pressure compartment to correspond with the respective specific gravities of the two liquids. For instance, if the specific gravity of the indicator liquid and the tank liquid are as 18 to 1, then the distance between the centers of the float and pressure compartments of the indicator chamber, and the distance between the center of the tank 2 and the pressure compartment are proportioned as 1 to 18; that is, the column (a—b) of mercury is made one eighteenth the length of the column (c—b) of tank liquid. Since, with the system in normal or horizontal position, the counterbalancing columns of indicator and tank liquids between the centers of the compartments and the tank is the controlling factor in securing the broad purposes of the invention, it will be clear that the specific form, shape and general character of the connections 12 and 13 may be varied and that their actual lengths between the compartments may be more or less modified by changes in direction, so long as the relative horizontal lengths of the columns of tank and indicator liquids remain as described. This relation of the length of the two columns of liquids whereby they are enabled to counterbalance each other regardless of change in the horizontal position of the system may be expressed as inversely proportional to the specific gravities of the two liquids.

To further make clear this feature of the invention, attention is directed to Fig. 6, which shows diagrammatically a system wherein the liquid in the indicator (mercury) and that in the tank (gasolene) are at the same level, their specific gravities being assumed substantially as 18 to 1. In this case the horizontal length (c—b) of tank liquid is eighteen times longer than the horizontal length (a—b) of the indicator liquid, and the system is in equilibrium with the pointer indicating the true height of the liquid in the tank when the system is horizontal. Assume that the level of the system is changed through an angle x, as by the automobile going down hill. The tank will be raised relative to the indicator through the angle x but the surface of the liquid therein will remain horizontal, extending in the plane denoted by the line e—f. Likewise the part 41 of the indicator chamber will be raised relative to the part 42 through the angle x, but the surface of the liquid in parts 41 and 42 will remain horizontal in the plane $g$—$h$ and $i$—$j$. Since the horizontal length of column ($a$—$b$) and ($c$—$b$) are related as one to eighteen, the tank will be raised eighteen times higher than the part 41 is raised higher than the part 42 of the indicator chamber; but since the length of the columns ($a$—$b$) and ($c$—$b$) are related inversely as the specific gravity of the liquids, the increased head $f$—$i$ of gasolene in the tank caused by its vertical movement will be automatically counterbalanced by the increased head $h$—$i$ of mercury caused by the rise of part 41 of the indicator, it being understood that the height of mercury in part 41 does not change relative to said part, with the result that for a given amount of gasolene the float and perforce the indicator remain in the same position as when the system is horizontal. The same is true whether the liquid surface in the tank be in the same horizontal plane as the liquid in the indicator when the system is horizontal, or at a higher level, as indicated in Fig. 7, the only distinction being that in the latter case there will be an initial head $m$ of mercury in part 41 of the indicator chamber to counterbalance the initial head $n$ of gasolene in the tank when the system is horizontal, and when the system is inclined through an angle $x$, as before, the increased head of indicator liquid will counterbalance the increased head of gasolene for the reasons already described.

From the construction described, it will be noted that regardless of change in relative height of parts of the system due to longitudinal inclination of the system, the pointer will always truly denote the amount of liquid in the tank. Automobiles, motor boats, and other carriers, however, are subjected to a transverse tilt or inclination due to road or other conditions, as well as a longitudinal inclination, and the present invention aims to nullify any effect of such transverse tilt upon the indicator. To this end, as indicated in Fig. 2, the vertical plane passing through the center of the tank is also made to pass through the center of the parts 41 and 42 of the indicator chamber, by adjusting the indicator chamber horizontally about the part 25 of the indicator as hereinbefore described. Obviously, if the center of the tanks and parts 41 and 42 are in the same vertical plane, then any transverse tilt at right angles to said plane will have no effect upon the height of the liquid either in the tank or the indicator chamber and the pointer will remain fixed for any given amount of liquid in the tank. A transverse tilt of the system at any other angle to the vertical plane passing through the center of the tank and indicator chamber parts 41 and 42 will be compounded of a transverse tilt at right angles to said plane and a longitudinal tilt or inclination, and as the construction hereinbefore described obviates any disturbance of the pointer due to either a transverse tilt at right angles to the vertical plane passing through the center of the tank and parts 41 and 42 and in a longitudinal direction, it follows that regardless of transverse or longitudinal inclination of the system, the indicator will at all times truly note the height or quantity of liquid in the tank.

While the indicator chamber is illustrated as having the parts 41 and 42 connected by a horizontal leg or passageway, it is obvious that the parts of the chamber may be variously formed and that the passageway may be otherwise than horizontal; also that the connections between the indicator chamber and tank may be variously formed and contrived within the true scope of the actual invention, which, so far as known, is the first instance where liquid in a tank has been so connected with an indicator that the latter will accurately denote the amount or height of liquid in the tank when the system is variously inclined. Herein, while referring to a horizontal leg or column of liquid, it is to be understood that distances of separation horizontally are meant and not that the connections or legs shall be strictly horizontal, as obviously the conduits or passageways may vary more or less to the horizontal within the true scope of the invention.

It will be obvious, also, that the present invention while peculiarly adapted to automobiles, motor boats, and the like for indicating at all times the amount of gasolene in the tank or reservoir notwithstanding either longitudinal or transverse inclination of the system, yet it is not restricted to this use, but is generally applicable to any tank, reservoir, or holder of a liquid which is subject to bodily disturbance such as herein suggested.

What is claimed is:

1. The combination of a tank or reservoir for holding a liquid, an indicator for indicating the height or quantity of liquid in said tank or reservoir, an indicator chamber having two connected compartments for holding an indicator liquid, connections between the tank or reservoir and one of said compartments containing liquid of different specific gravity from that in the indicator chamber, the distance between the vertical centers of said connected compartments and the vertical centers of the tank or reservoir and the connected compartment being inversely proportional to the specific gravities of the two liquids.

2. The combination of a tank or reservoir for holding a liquid, an indicator chamber having connected compartments for containing indicator liquid, a connection between the tank or reservoir and the upper part of one of said compartments containing liquid of different specific gravity from that in the indicator chamber, the lengths of the columns of said liquids between the vertical centers of the compartments and between the tank or reservoir and one of said compartments being related horizontally inversely as the specific gravities of the two liquids.

3. In a device of the character described, the combination of a tank or reservoir for holding a liquid, an indicator chamber for holding an indicator liquid of different specific gravity from the liquid in said tank or reservoir and having a horizontal column of indicator liquid, a connection between the tank or reservoir and indicator chamber including a horizontal column of tank liquid, the length of the column of indicator liquid and tank liquid being inversely proportional to the specific gravities of the liquids.

4. In a device of the character described, the combination of a tank for holding liquid, an indicator chamber for holding an indicator liquid, an indicating device controlled by the indicator liquid for indicating the quantity or height of liquid in the tank, and connections between the indicating device and the tank containing columns of liquids of different specific gravities and of lengths inversely as the specific gravities of the liquids therein.

5. In a device of the character described, the combination of a tank or reservoir for containing a liquid, an indicating device to denote the amount or height of liquid in the tank or reservoir, and means acting to cause said device to correctly indicate the amount or height of liquid in the tank when the system is inclined to the horizontal, said means being disposed between the tank or reservoir and indicating device and comprising columns of liquids of lengths inversely proportional to the specific gravities of the respective liquids.

6. In a device of the character described, the combination of a tank or reservoir for containing liquid, an indicating element to denote the amount or height of liquid in the tank or reservoir, and connections between the tank and indicating element containing columns of indicator liquid and tank liquid of horizontal lengths inversely proportional to the specific gravities of the tank and indicator liquids.

7. In a device of the character described, the combination of a tank for holding liquid, an indicator chamber for holding an indicator liquid, an indicating device controlled by the indicator liquid for indicating the quantity or height of liquid in the tank, connections between the indicating device and the tank containing columns of liquids of different specific gravities and of lengths inversely as the specific gravities of the liquids therein, and means for adjustably retaining the indicator chamber in the vertical plane passing through the center of the tank or reservoir so that the indicating device may correctly show the quantity or height of liquid in the tank or reservoir when the system is inclined and tilted laterally.

8. The combination of a tank or reservoir for holding a liquid, an indicator for indicating the height or quantity of liquid in the tank, an indicator chamber having connected parts containing a horizontal column of liquid, a connection between the tank and indicator chamber containing a horizontal column of liquid of different specific gravity from that in the indicator chamber, the lengths of said columns of liquid being inversely proportional to the specific gravities of the liquids, and means permitting relative adjustment of the tank or reservoir and indicator chamber to bring the centers thereof into the same vertical plane.

9. In a device of the character described, the combination of a tank or reservoir, an indicating device to note the height or amount of liquid in the tank or reservoir, an indicating chamber comprising two parts and a connection between said two parts containing indicator liquid, and a connection between the tank or reservoir and one of said parts, said last named connection and the connection containing indicator liquid between the center of said two parts being of lengths inversely as the specific gravity of the liquids.

10. In a device of the character described, the combination of a tank or reservoir for holding a liquid, an indicator including a chamber having two parts for holding vertical columns of indicator liquid, a connection having a passageway between said parts, a connection between the tank or reservoir and one of said parts, means controlled by the height of indicator liquid in the other of said parts to indicate the height or quantity of liquid in the tank or reservoir, and means for adjustably retaining said chamber with the center of the two parts in the vertical plane passing through the center of the tank.

11. The combination of a tank or reservoir for holding a liquid, an indicator chamber having two parts, a connection between said parts containing a horizontal column of liquid between the centers of said parts, a connection between the tank and a part of the indicator chamber, said connections and columns of liquid therein being related horizontally inversely as the specific gravity of the two liquids, a float in a part of said chamber, and an indicating device connected to the float.

12. In a device of the character described, the combination of a tank or reservoir for holding liquid, an indicator including an indicating chamber comprising two parts for holding columns of indicator liquid, a connection having a passageway connecting said parts, a connection between one of said parts and the tank or reservoir containing tank liquid, a float controlled by the liquid in the other of said parts, a device actuated from the float to indicate the quantity or height of liquid in the tank, and means for adjustably retaining the relation of the float and said device.

13. In a device of the character described, the combination of a support, a stem adapted to pass through said support, an indicator device carried by the stem at one side of the support, means adapted to supports of varying thickness for clamping the stem and indicating device to said support, and an indicator chamber carried by said stem.

14. In a device of the character described, the combination of a tank or reservoir for holding liquid, an indicator including a stem provided with a longitudinal passageway, an indicator disk attached to said stem, a support through which the stem is passed, means for clamping the stem to said support, a float, an indicator chamber in which the float operates, a pointer movable over the disk, and connections between the pointer and float extending through the stem.

15. In a device of the character described, the combination of a tank or reservoir, an indicator including a stem having a longitudinal passageway, an indicating device to note the height of quantity of liquid in the tank or reservoir, means passing through the stem for actuating said device, a support for the stem, and means adapted to supports of varying thickness for clamping the stem to said support.

16. In a device of the character described, the combination of a tank or reservoir for holding liquid, an indicator chamber containing indicator liquid and communicating with said tank or reservoir, a stem, a support to which the stem is connected, and means for adjustably connecting the stem and indicator chamber to permit the latter to be moved horizontally.

17. In a device of the character described, the combination of a tank or reservoir for holding liquid, an indicator chamber containing indicator liquid and communicating with said tank or reservoir, a float in said chamber, a rod to which the float is connected, an indicating device, slip joint connections between the indicating device and the said rod, and means opposite the indicating device and the end of the rod for holding the slip joint in operative connection.

18. In a device of the character described, the combination of a tank or reservoir for holding liquid, an indicator for indicating the height of liquid in the tank or reservoir, said tank or reservoir having an outlet opening for leading to a source of use for said liquid, and a connection between the tank or reservoir and indicator including an inlet tube having a side inlet opening and a wire gauze or screen protecting the side opening of said tube.

19. In a device of the character described, the combination of a tank or reservoir for holding liquid, an indicator for indicating the height of liquid in the tank or reservoir, said tank or reservoir having an outlet opening and leading to a source of use for said liquid, and a connection between the tank or reservoir and indicator including an inlet tube having a side inlet opening facing away from the said outlet opening leading to the source of use of the liquid.

20. In a device of the character described, the combination of a tank, an indicator, an indicator chamber communicating with said tank, a pointer and scale, means in said chamber for relatively moving the pointer and scale to indicate the height or amount of liquid in the tank, interlocking projections between the pointer and said means, and means for maintaining the interlocking projections in operative engagement.

21. In a device of the character described, a receptacle or holder for liquid, an indicator having a chamber comprising a leg or column of indicator liquid including a horizontal portion, a pipe connection between the tank and said chamber including a leg or column of tank liquid having a horizontal portion, said horizontal portions of indicator liquid and tank liquid being of lengths respectively proportioned inversely as the specific gravities of the two liquids.

In testimony whereof, we have signed our names to this specification, in the presence of two subscribing witnesses.

CLARE H. DRAPER.
CHARLES F. ROPER.

Witnesses:
WM. O. PERKINS,
SHELLEY D. VINCENT.